INVENTORS
Frederick R. Pullen
Eugene K. McLachlan

United States Patent Office 3,378,247
Patented Apr. 16, 1968

3,378,247
DIVISION WALL FOR SOAKING PITS
Frederick R. Pullen and Eugene K. McLachlan, Johnstown, Pa., assignors, by mesne assignments, to Bethlehem Steel Corporation, a corporation of Delaware
Filed Sept. 16, 1964, Ser. No. 396,931
4 Claims. (Cl. 263—44)

ABSTRACT OF THE DISCLOSURE

A division wall, separating adjacent furnace chambers, including refractory walls separated by a space which is divided into vertical flues through which air is circulated to cool the refractory.

---

Figure 1:
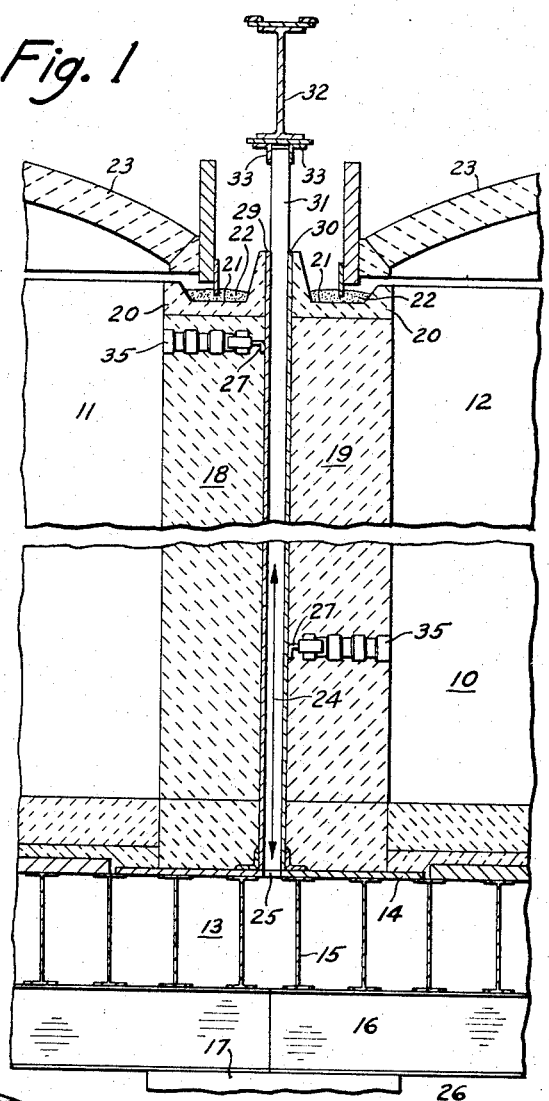

This invention relates to a division wall between two furnaces, and more particularly to an improved type of air cooled division wall which is utilized to separate the furances of a battery of soaking pits.

A soaking pit is a furnace built to contain, in an upright position, a plurality of steel ingots which are to be uniformly heated to their rolling temperature. Conventionally, several pits are built in a row, called a battery, which is usually located at the entering side of a blooming or slabbing mill. Most soaking pits are rectangular, and their walls are usually constructed of silica refractory shapes. Special grooved coping blocks which cap these walls form a continuous trough around the top of each pit. Granular refractory material, usually sand, fills each trough and forms a seal between the walls of a pit and its cover when in the closed position. The pit covers are movable and are positioned by means of individual carriages which travel along track beams located on opposite sides of the pits.

Due to the nature of the operation of soaking pits the walls are exposed to alternate heating and cooling. Under these conditions the grooved coping blocks at the tops of the walls sometimes separate and allow the granular seal material to sift downwardly between the refractory shapes of the walls. The granular material expands as the pits are brought up to operating temperature and this expansion forces the wall shapes and the coping blocks to move farther apart, thereby allowing more of the refractory material to enter the wall. This action continues, and the amount of granular material which falls from the seal between the refractory shapes increases until eventually the wall loses its shape and buckles outwardly.

In division walls, i.e. the walls which separate adjacent furnaces of a battery of soaking pits, the deterioration and failure of the refractory construction creates a difficult problem. Repairs to these walls are difficult to make because they are of double thickness and serve two separate furnaces. It is dangerous and extremely difficult to repair a portion of such a wall while its opposite side is exposed to elevated temperatures. A soaking pit furnace which has a wall or walls to be repaired must first be taken out of service and allowed to cool before men can enter the furnace to make repairs. When a division wall must be repaired it is often necessary to curtail the operation of the adjacent furnace, on the opposite side of the wall undergoing repairs, in order to insure that there will be no flame impingement through the wall into the work area.

Accordingly, it is an object of this invention to provide an improved construction for division walls separating the individual furnaces of a battery of soaking pits.

Another object is to provide means to cool and reinforce soaking pit battery division walls in order to increase their effective life and facilitate their repair.

It is a still further object of the present invention to provide an improved division wall construction which can be readily employed in existing batteries of soaking pit furnaces without material alterations to their present structural framework.

The objects and advantages of this invention will be more clearly understood from the following description with reference to the accompanying drawings in which:

FIGURE 1 is a vertical sectional view of a division wall separating adjacent soaking pit furnaces which have their covers in the closed and sealed position.

Figure 2:
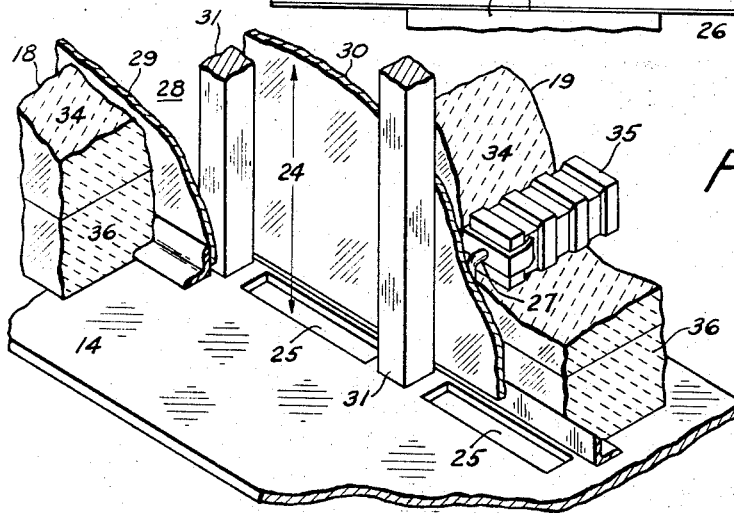

FIGURE 2, partly in section, is an isometric view showing, in detail, the construction of the bottom portion of the improved division wall of this invention.

Referring in detail to the drawings there is shown division wall 10 which separates adjacent furnaces 11 and 12 of a battery of soaking pits that are heated to temperatures as high as 2200° F. As in the usual soaking pit construction, division wall 10 extends upwardly from a supporting structure 13 comprising a bottom plate 14, two tiers of spaced horizontal beams 15 and 16 and concrete piers 17. Division wall 10 is formed of refractory wall elements 18 and 19 which may or may not be interlocked and which are respectively the adjacent side walls of furnaces 11 and 12. Each wall element is capped with grooved refractory coping blocks 20. Blocks 20 together with similar blocks on top of the other walls, not shown, of furnaces 11 and 12 form a continuous trough 21 around the top of each furnace. Trough 21 is filled with a granular refractory material 22, usually sand, which forms a seal between the top of each furnace and its cover 23.

Disposed centrally within division wall 10, between wall elements 18 and 19, and extending upwardly from base plate 14, are a plurality of longitudinally spaced cooling flues or ducts 24, of any suitable construction, arranged with their axes vertical and in a common plane. Flues 24 are open at their tops and bottoms, they extend the full height of division wall 10, and they register with openings 25 in bottom plate 14. This construction permits the free unrestricted circulation of air from passageway or scale pit 26, located beneath the furnace, through openings 25 in bottom plate 14, and through and out the tops of flues 24. Metal clips 27 are joined to ducts 24 in any suitable manner, as by welding, and anchor refractory wall elements 18 and 19 to flues 24 thereby strengthening wall 10.

The preferred embodiment of the air cooled division wall construction of our invention includes a flue assembly 28, shown in detail in FIGURE 2, disposed between wall elements 18 and 19. Assembly 28 extends longitudinally of division wall 10, from front to back thereof, and comprises vertical plates 29 and 30, extending upwardly from base plate 14 to the tops of wall elements 18 and 19, respectively, between which are disposed vertical billets 31, spaced a predetermined distance apart. This construction forms assembly 28 which contains a plurality of vertical flues 24 adjacent to each other and aligned from front to back of division wall 10. Billets 31 are positioned between openings 25 in bottom plate 14 so that these openings are in line with flues 24. Plates 29 and 30 and billets 31 are joined together in any suitable manner, as by welding, to form flue assembly 28 which is joined to bottom plate 14 in similar fashion. Preferably, billets 31 of flue assembly 28 extend above the top of division wall 10 to the underside of furnace cover carriage track beam 32 which extends longitudinally of this wall from front to back, about 2 feet above it. A carriage, not shown, moves along two track beams 32, located at opposite sides of a furnace, when moving cover 23 into and out of position. Preferably the upper ends of billets 31 are positioned between the legs of angles 33, which are joined to the underside of beam 32.

Refractory wall elements 18 and 19 are formed of rammed plastic material 34. Anchor tiles 35 are embedded a predetermined distance apart in material 34, and are attached to duct assembly 28 by means of clips 27.

In the usual manner of constructing the division wall of our invention, flue assembly 28 is fabricated and erected in place on bottom plate 14. Wall elements 18 and 19 are started on either side of duct assembly 28 by placing a row of refractory blocks 36 on plate 14. Wooden forms, not shown, are built upwardly from the outer faces of blocks 36, and the spaces between the forms and plates 29 and 30 are filled with plastic material 34 which is rammed in place in the usual manner of constructing rammed walls. When the rammed plastic material 34 reaches a predetermined level, clips 27 are fastened, a predetermined distance apart, to plates 29 and 30, and anchor tiles 35 are disposed on these clips. The intervening spaces between tiles 35 are rammed with plastic material 34 and the construction of the walls continued in this manner to a predetermined elevation. Wall elements 18 and 19 are then capped with coping blocks 20 to complete division wall 10.

The construction of the wall of our invention, in a battery of soaking pits, produces a number of desirable results. The life of the division walls is lengthened and only the furnace undergoing repairs needs to be shut down when only a portion of its division wall or walls must be rebuilt. The vertical flues extending through the division wall act in heat exchange relationship with the wall and enable it to operate at a lower internal temperature than is possible without these cooling flues. The clips connected to the ducts provide a means of anchoring the refractory wall elements solidly in place and facilitate partial repairs of these elements. The preferred embodiment of our invention creates a baffle between wall elements of a division wall, thereby preventing any flame impingement through the wall, and extending the billets of the flue assembly to the underside of the furnace cover carriage track beam strengthens the entire division wall.

While one embodiment of our invention has been illustrated and described with particular reference to soaking pit furnaces, it will be understood by those familiar with furnace art that the division wall of our invention may be readily embodied in a furnace structure having two or more adjacent furnaces separated by a single wall. It is to be understood that changes in the size and construction of the flues can be readily made and that there may be various embodiments of our invention within the general scope of the present invention and the scope of the appended claims.

We claim:

1. Division wall means separating first and second adjacent furnaces beneath which a passageway extends, said division wall means being supported at the bottom by supporting means and comprising:
    (a) spaced first and second refractory wall elements associated with said first and second furnaces respectively supported by said supporting means and extending upwardly,
    (b) a plurality of vertical flues, open at their tops and bottoms, separated by divider means interposed between said first and second refractory wall elements and extending upwardly from said supporting means, said flues being adjacent to each other and aligned from front to back of said division wall means,
    (c) openings in said supporting means, registering with said vertical flues, through which openings cooling fluid is adapted to be passed from said passageway to said vertical flues.

2. Division wall means separating first and second adjacent furnaces beneath which a passageway extends, said division wall means being supported at the bottom by supporting means and comprising:
    (a) first and second refractory wall elements associated with said first and second furnaces respectively supported by said supporting means and extending upwardly,
    (b) first and second vertical parallel plate means extending upwardly from said supporting means to the tops respectively of said first and second wall elements and extending from front to back of said division wall means,
    (c) means interposed between said first and second vertical plate means, extending upwardly from said supporting means, defining a plurality of vertical flues open at their tops and bottoms, said flues being adjacent to each other and aligned from front to back of said division wall,
    (d) openings in said supporting means, registering with said vertical flues, through which openings cooling fluid is adapted to be passed from said passageway to said vertical flues.

3. Division wall means separating first and second adjacent furnaces, said wall means being supported at the bottom by supporting means and comprising:
    (a) spaced first and second refractory wall elements supported by said supporting means and extending upwardly, said first wall element associated with said first furnace and said second wall element associated with said second furnace,
    (b) spaced divider means extending upwardly from said supporting means and being interposed between said first and second refractory wall elements and dividing said space therebetween into a plurality of flues having open tops and bottoms,
    (c) connecting means within said division wall extending longitudinally thereof and secured to said divider means to maintain the position thereof.

4. Division wall means separating first and second adjacent soaking pit furnaces and having spaced thereabove a longitudinally extending beam, said division wall means being supported by supporting means and comprising:
    (a) spaced first and second refractory wall elements, supported by said supporting means and extending upwardly, said first wall element associated with said first furnace and said second wall element associated with said second furnace,
    (b) spaced divider means, extending upwardly to said longitudinally extending beam, interposed between said first and second refractory wall elements and dividing said space therebetween into a plurality of flues having open bottoms and open tops,
    (c) connecting means within said division wall extending longitudinally thereof and secured to said divider means to maintain the position thereof.

References Cited
UNITED STATES PATENTS

| | | | |
|---|---|---|---|
| 52,813 | 2/1866 | Baker | 263—36 |
| 1,811,979 | 6/1931 | Smally | 263—44 |
| 2,074,370 | 3/1937 | Coulton | 98—31 |
| 2,267,864 | 12/1941 | Hosbein | 110—1 |
| 2,278,189 | 3/1942 | Barnes | 110—1 |
| 2,512,854 | 6/1950 | Edgerly | 98—31 X |
| 3,315,950 | 4/1967 | Potocnik et al. | 263—44 |

J. SPENCER OVERHOLSER, *Primary Examiner.*

R. S. ANNEAR, *Assistant Examiner.*